(12) United States Patent
Higgins

(10) Patent No.: US 12,145,083 B2
(45) Date of Patent: Nov. 19, 2024

(54) GREASE RECOVERY UNIT

(71) Applicant: The Filta Group Limited, Rugby (GB)

(72) Inventor: Malcolm Christopher Higgins, Minehead (GB)

(73) Assignee: The Filta Group Limited, Rugby (GB)

( * ) Notice: Subject to any disclaimer, the term of this patent is extended or adjusted under 35 U.S.C. 154(b) by 59 days.

(21) Appl. No.: 17/615,295

(22) PCT Filed: May 27, 2020

(86) PCT No.: PCT/GB2020/051274
§ 371 (c)(1),
(2) Date: Nov. 30, 2021

(87) PCT Pub. No.: WO2020/240172
PCT Pub. Date: Dec. 3, 2020

(65) Prior Publication Data
US 2022/0193575 A1    Jun. 23, 2022

(30) Foreign Application Priority Data

May 31, 2019   (GB) ...................................... 1907783

(51) Int. Cl.
*B01D 17/02* (2006.01)
*B01D 17/04* (2006.01)
(Continued)

(52) U.S. Cl.
CPC ...... *B01D 17/0217* (2013.01); *B01D 17/0211* (2013.01); *B01D 17/042* (2013.01);
(Continued)

(58) Field of Classification Search
CPC ................... E03F 5/16; B01D 17/0217; B01D 17/0211; B01D 17/042; B01D 29/01;
(Continued)

(56) References Cited

U.S. PATENT DOCUMENTS 1,708,021 A  *  4/1929  Charles .............. B01D 17/0208
                                                    210/538
3,283,907 A  *  11/1966  Whiting ............... B01D 35/153
                                                    210/234
(Continued)

FOREIGN PATENT DOCUMENTS

CN      101948155 B  *  5/2012
JP      H05192509 A  *  8/1993
WO      1997023264      7/1997

*Primary Examiner* — Liam Royce
(74) *Attorney, Agent, or Firm* — Weiss & Moy, PC; Jeffrey D. Moy

(57) ABSTRACT

A grease recovery unit, particularly for use in a food service establishment, for separating oily substances from water in waste food has an inlet 2 connected via a valve 26 to a strainer 24, where solids are collected. The valve 26 is interlinked with the strainer 24 so that the valve closes the inlet 2 when the strainer 24 is removed. Oily substances from the food waste is separated from water by at least one hydrocyclone 30. Water that is separated is passed out of outlet 4 and the oily substances are passed into a collector 3. Fatty substances in the oily substances are held in a fluid state by a silicon heater pad 60.

7 Claims, 3 Drawing Sheets

Figure 4:
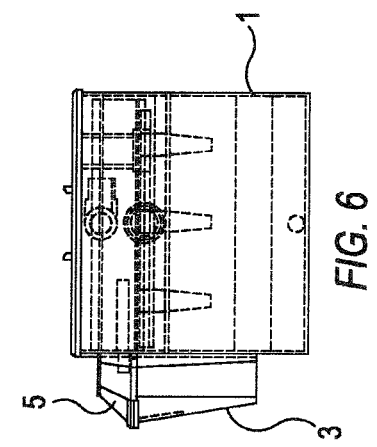

(51) Int. Cl.
*C02F 1/00* (2023.01)
*C02F 1/38* (2023.01)
*C02F 1/40* (2023.01)
*E03F 5/16* (2006.01)
*C02F 101/32* (2006.01)
*C02F 103/32* (2006.01)

(52) U.S. Cl.
CPC ............... *C02F 1/001* (2013.01); *C02F 1/38* (2013.01); *C02F 1/40* (2013.01); *E03F 5/16* (2013.01); *C02F 2101/32* (2013.01); *C02F 2103/32* (2013.01)

(58) Field of Classification Search
CPC ............ B01D 21/267; C02F 1/38; C02F 1/40; C02F 2101/32; C02F 2103/32
See application file for complete search history.

(56) References Cited

U.S. PATENT DOCUMENTS

| | | | | |
|---|---|---|---|---|
| 4,324,173 | A * | 4/1982 | Moore | A47J 37/1223 219/509 |
| 4,990,246 | A * | 2/1991 | Blazejczak | B01D 19/02 210/219 |
| 6,409,808 | B1 * | 6/2002 | Chamberlain | B01D 17/00 96/182 |
| 10,717,026 | B1 * | 7/2020 | Anderson | B01D 19/0057 |
| 2006/0163147 | A1 * | 7/2006 | Dierkes | E03F 5/0404 210/207 |
| 2011/0042288 | A1 | 2/2011 | Chen et al. | |
| 2016/0243464 | A1 | 8/2016 | Holbrook | |

* cited by examiner

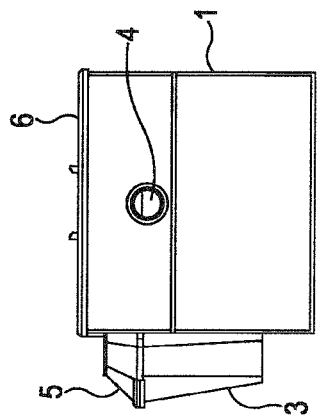
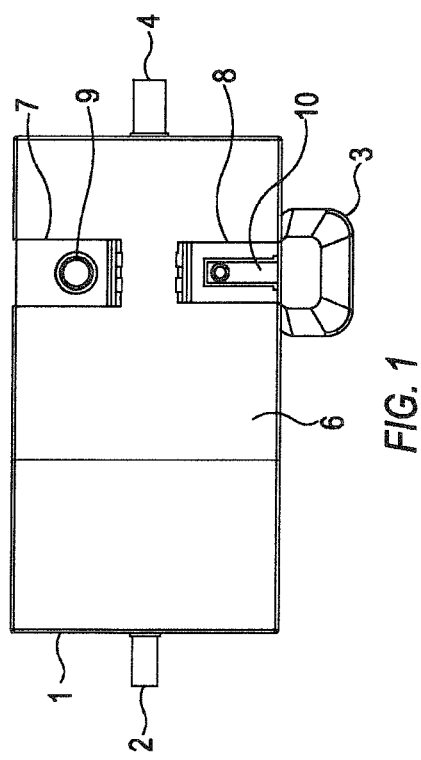
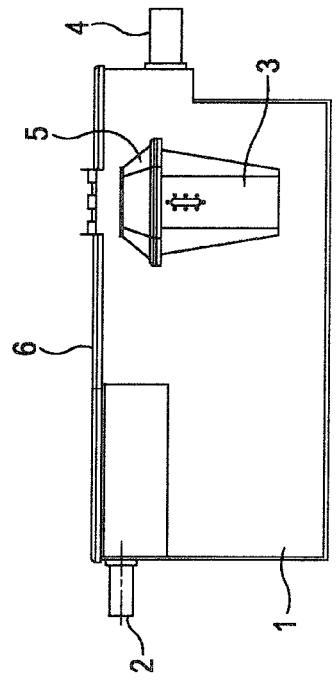

GREASE RECOVERY UNIT

This invention relates to a grease recovery unit particularly, although not exclusively, for a food service establishment.

In many countries it is unlawful for food service establishments to put fats, oils and grease into a public drainage system and to do so causes unnecessary blockages which are extremely costly to clear.

Currently, passive traps for waste products like fats, oils and grease are prone to failure. These units also have a poor fats, oils and grease recovery due to insufficient residence time within the unit and they suffer from food waste build-up because the food collection basket is frequently omitted. Such a unit is the FATSTRIPPA™ F5125. The FATSTRIPPA™ FS125 uses a 1.5 kw heating element to maintain fatty substances in a fluid state and so is expensive to run and because of the high power there is an increased risk of fire. This unit suffers from the same difficulties, as noted above, with grease recovery units.

The present invention seeks to provide a grease recovery unit in which the foregoing difficulties are substantially mitigated.

According to a first aspect of this invention there is provided a grease recovery unit for a food service establishment including a hydrocyclone arranged to separate oily substance from water.

According to a preferred embodiment of this invention there is provided a grease recovery unit for a food service establishment including a housing having an inlet to receive, inter alia, water and oily substances, said inlet being in communication with a strainer for retaining solids in the oily substances, and a at least one hydrocyclone arranged to separate the oily substances from the water, whereby the oily substances are passed for collection and water is passed through an outlet of said housing.

In some embodiments a plurality of hydrocyclones are employed.

In a preferred embodiment, six hydrocyclones are employed.

Advantageously, said strainer is interlinked with a cut-off valve located in said inlet, whereby the cut-off valve is open only when the strainer is in situ and said cut-off valve is closed when the strainer is removed to prevent food waste and debris passing into the unit.

Preferably, a heater is provided in a chamber in the housing through which the oily substances are passed, whereby the heater is arranged to maintain fatty substances in the oily substances in a fluid state.

Advantageously, said heater is a silicon heater pad having a power consumption in the range of 20 w-80 w.

Preferably, the power consumption of the silicon heater pad is in the range 30 w-50 w.

Conveniently, the oily substances are transferred to a collector arranged to be removably attached to an external surface of said housing.

Advantageously, the housing is divided into three chambers by baffles, the first chamber locating the at least one hydrocyclone, the second chamber locating the heater thereabove and an outlet for the oily substances to said collector, and the third chamber locating the water outlet.

Typically, the oily substances may be fats, oils and grease.

According to a feature of this invention there is provided a method of separating oily substances from water in waste food including the steps of passing said oily substances through a hydrocyclone to separate said oily substances from the water, passing said material to a collector, and passing said water to an outlet.

Figure 7:
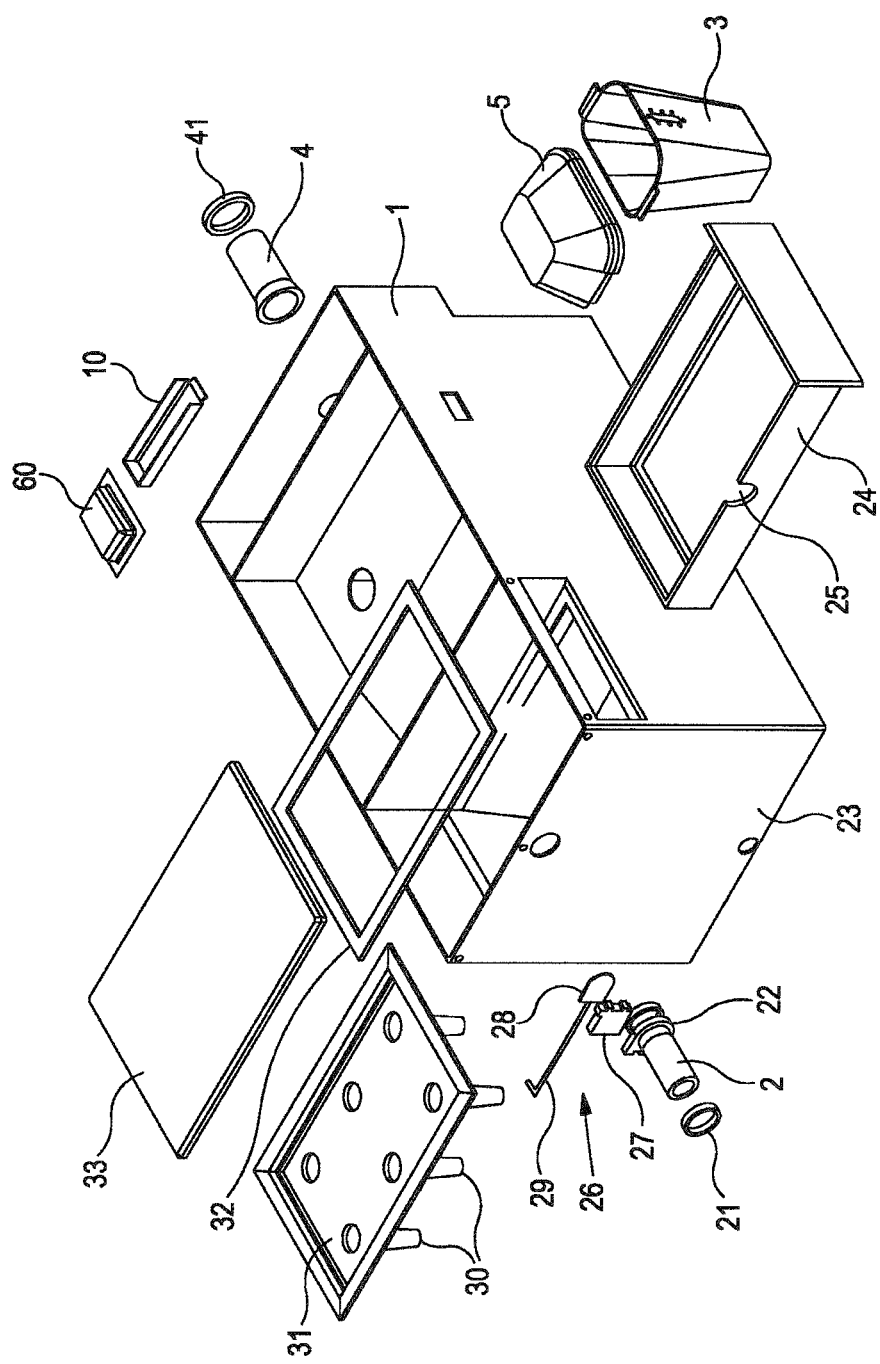

The invention will now be described, by way of example, with reference to the accompanying schematic drawings, in which:

FIG. 1 shows a top view of a grease recovery unit in accordance with this invention, FIG. 2 shows a side view of the grease recovery unit shown in FIG. 1, FIG. 3 shows a right-hand end view of the grease recovery unit shown in FIGS. 1 and 2, FIGS. 4, 5 and 6 correspond with FIGS. 1, 2 and 3 respectively, but show hidden detail within the grease recovery unit, and FIG. 7 shows an exploded perspective view of the grease recovery unit shown in the preceding Figures.

In the Figures like reference numerals denote like parts.

Referring to FIGS. 1-6, the grease recovery unit has a housing 1 having an inlet 2 arranged to receive, inter alia, water and oily substances such as fats, oils and grease which are required to be treated. The substances are separated in hydrocyclones to be hereinafter described with the oily substances being collected in a collector 3 and cleaned water being passed out of an outlet 4. As shown in the Figures, the collector 3 has a top cover 5.

The housing 1 has a cover 6 in which is located a pair of hinged doors 7, 8, the door 7 covers a fume vent 9 for venting vapour from the oily substances and the door 8 covers a chute 10 arranged to direct oily substances into the collector 3.

Referring now to FIGS. 4-7, the inlet 2 has a collar 21 for connection to a pipe (not shown) into which oily substances such as fats, oil, grease and water are introduced. The inlet is provided with a seal 22 for sealing the inlet to a side wall 23 of the housing.

A removable strainer 24 has a draw-like structure with the strainer in the base of the draw and a left-hand side wall (as shown in FIG. 7) has a notch 25 for interlinking with a cut-off valve 26, the cut-off valve having a housing 27 and a seal 28 for opening and closing the inlet 2, the seal 28 being attached to a connecting rod 29. The cut-off valve 26 is arranged to be interconnected with the strainer 24 so that, when the strainer is in situ, the cut-off valve is open and when the strainer is removed, the valve closes the inlet to prevent substances passing into the strainer. Although in the present embodiment a mechanical interlink between the strainer and cut-off valve is shown, it is to be understood that the cut-off valve could, alternatively, be electronically actuated dependent upon the position of the strainer 24.

Located beneath the strainer 24 are six spaced hydrocyclones 30 arranged in a frame 31. Although six hydrocyclones are shown in the currently preferred embodiment, it is to be understood that more or fewer hydrocyclones could be employed in dependence upon the amount of waste substances to be processed. Each hydrocyclone is arranged to separate and sort the oily substance particles in a fluid suspension, usually water, based upon the ratio of the centrifugal force of the particles to fluid resistance. Mounted over the strainer on top of the housing is a seal 32 and a cover 33.

Figure 5:
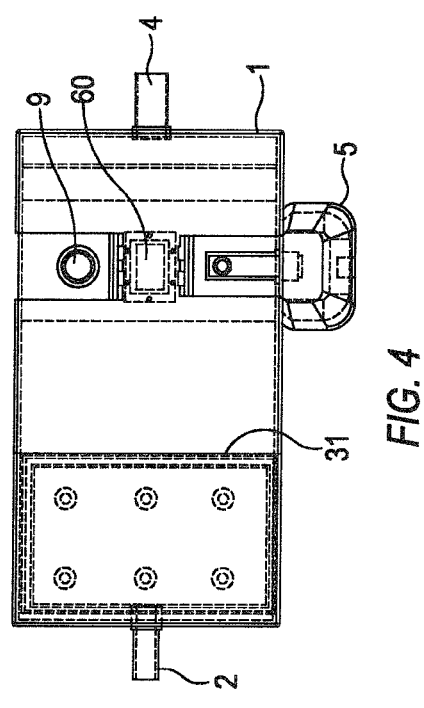
Figure 6:
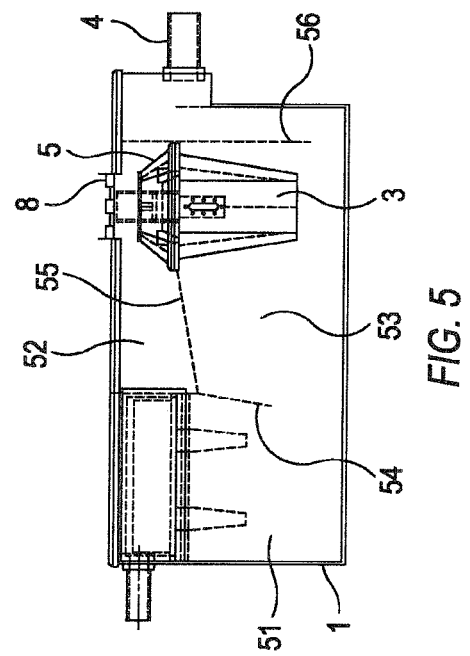

As shown in FIG. 5, the housing is divided into three chambers 51, 52, 53 by baffles 54, 55, 56, the first chamber 51 locating the hydrocyclones 30, the second chamber 52 locating a silicon heater pad 60 and the outlet for the oily substances to the collector 3. The third chamber 53 locates the water outlet 4 which is arranged to have a connecting collar 41. The silicon heater pad located above the second chamber 52 has a power consumption in the range 20 w-80 w, preferably 30 w-50 w and it will be understood that the power consumption of this heater pad is considerably lower than the 1.5 kw heater elements of the prior art, rendering the grease recovery unit of this invention with much greater fuel efficiency.

The top cover 6 is omitted from FIG. 7 for clarity.

In operation, water, fats, oils and grease are input into inlet 2 and solids are strained and retained by strainer 24. Oils, fats and grease are separated from water by the hydrocyclones 30. Oily substances from the fats, oils and grease rise into chamber 52 where the silicon heater pad maintains fatty substances in the oily substances in a fluid state. The oily substances traverse chute 10 into the collector 3. The collector 3 is arranged to be removably attached to an external surface of the housing 1 so that a build-up of substances in the collector 3 may be emptied from the collector 3. Water cleaned from the oily substances is passed out of outlet 4.

The grease recovery unit of the present invention not only uses considerably less power than known grease recovery units, but also, in trials, collected fifty percent more fats, oils and grease than known units and so represents a considerably advance in the art.

In this specification an apparatus/method/product "comprising" certain features is intended to be interpreted as meaning that it includes those features, but that it does not exclude the presence of other features.

Many variations are possible without departing from the scope of the present invention as defined in the appended claims.

The invention claimed is:

1. A grease recovery unit for use in a food service establishment comprising:
   a housing (1) having an inlet (2) to receive, inter alia, water and oily substances, wherein the housing is divided into three chambers by baffles, a first chamber (51) locating at least one hydrocyclone (30), a second chamber (52) locating a heater (60) and an outlet for the oily substances to a collector (3), and a third chamber (53) locating a water outlet (4); and
   a strainer (24) in communication with said inlet for retaining solids in the oily substances, said strainer is upstream of said at least one hydrocyclone (30) which is located beneath said strainer, said at least one hydrocyclone being arranged to separate the oily substances from the water;
   wherein the heater arranged to maintain fatty substances in the oily substances in a fluid state before the oily substances are passed for collection in said collector (3) and water is passed through said outlet (4) of said housing.

2. The unit as claimed in claim 1 wherein said strainer (24) is interlinked with a cut-off valve (26) located in said inlet (2), whereby the cut-off valve is open only when the strainer is in situ and said cut-off valve is closed when the strainer is removed to prevent food waste and debris passing into the unit.

3. The unit as claimed in claim 1, wherein said heater is a silicon heater pad having a power consumption in the range of 20w-80w.

4. The unit as claimed in claim 3, wherein the power consumption of the silicon heater pad is in the range 30w-50w.

5. The unit as claimed in 1, wherein the oily substances are transferred to the collector (3) arranged to be removably attached to an external surface of said housing.

6. The unit as claimed in claim 1 wherein a plurality of hydrocyclones (30) are employed.

7. The unit as claimed in claim 6 wherein six hydrocyclones (30) are employed.

* * * * *